US009424598B1

(12) United States Patent
Kraft

(10) Patent No.: US 9,424,598 B1
(45) Date of Patent: Aug. 23, 2016

(54) VISUAL SEARCH IN A CONTROLLED SHOPPING ENVIRONMENT

(71) Applicant: A9.com, Inc., Palo Alto, CA (US)

(72) Inventor: Adam Wiggen Kraft, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 20 days.

(21) Appl. No.: 14/094,655

(22) Filed: Dec. 2, 2013

(51) Int. Cl.
*G06Q 30/00* (2012.01)
*G06Q 30/06* (2012.01)

(52) U.S. Cl.
CPC ...... *G06Q 30/0627* (2013.01); *G06Q 30/0601* (2013.01)

(58) Field of Classification Search
CPC ............. G06Q 30/0601; G06Q 30/0645; G06Q 30/08
USPC .............................. 705/26.1–27.2
See application file for complete search history.

(56) References Cited

U.S. PATENT DOCUMENTS

| 3,001,439 | A | 9/1961 | Rouy |
| 4,876,457 | A | 10/1989 | Bose |
| 5,611,000 | A | 3/1997 | Szeliski et al. |
| 5,694,491 | A | 12/1997 | Brill et al. |
| 5,717,781 | A | 2/1998 | Ebel et al. |
| 5,974,159 | A | 10/1999 | Lubin et al. |
| 5,983,218 | A | 11/1999 | Syeda-Mahmood |
| 6,075,905 | A | 6/2000 | Herman et al. |
| 6,307,959 | B1 | 10/2001 | Mandelbaum et al. |
| 6,580,811 | B2 | 6/2003 | Maurer et al. |
| 6,731,788 | B1 | 5/2004 | Agnihotri et al. |
| 6,941,016 | B1 | 9/2005 | Wagman et al. |
| 7,003,161 | B2 | 2/2006 | Tessadro |
| 7,072,872 | B2 | 7/2006 | Caid et al. |
| 7,109,987 | B2 | 9/2006 | Goel et al. |
| 7,206,437 | B2 | 4/2007 | Kramer et al. |
| 7,209,601 | B2 | 4/2007 | Manabe |

(Continued)

FOREIGN PATENT DOCUMENTS

| CN | 101010693 A | 8/2007 |
| CN | 101231662 A | 7/2008 |

(Continued)

OTHER PUBLICATIONS

"European Search Report dated Jun. 6, 2013", Europe Application 10744249.3, Jun. 6, 2013, 5 pages.

(Continued)

*Primary Examiner* — Jason Dunham
*Assistant Examiner* — Katherine O'Sullivan
(74) *Attorney, Agent, or Firm* — Hogan Lovells US LLP

(57) ABSTRACT

Various embodiments enable a customer to quickly search additional information (e.g., product variations, sizes, price and availability) related to a specific product. For example, the customer can request additional information of a specific product by submitting an image of the specific product from a computing device. In one embodiment, location of the customer can be determined based on the image submitted by the customer. Product features can be extracted from the image according to various imaging processing and text recognition algorithms and then used to match products that are within view of the customer. A search results with additional information of the specific product can be provided to the computing device for presentation to the customer.

24 Claims, 7 Drawing Sheets

(56) References Cited

U.S. PATENT DOCUMENTS

| | | |
|---|---|---|
| 7,251,637 B1 | 7/2007 | Caid et al. |
| 7,894,689 B2 | 2/2011 | Liu et al. |
| 8,126,247 B2 | 2/2012 | Chiang et al. |
| 8,126,272 B2 | 2/2012 | Carr et al. |
| 8,184,155 B2 | 5/2012 | Ke |
| 8,406,507 B2 | 3/2013 | Ruzon et al. |
| 8,930,134 B2* | 1/2015 | Gu .................. G06Q 30/0205 701/434 |
| 9,071,814 B1 | 6/2015 | Fan et al. |
| 9,256,795 B1 | 2/2016 | Gray et al. |
| 2002/0181745 A1 | 12/2002 | Hu |
| 2003/0225686 A1 | 12/2003 | Mollett et al. |
| 2004/0088291 A1 | 5/2004 | Matsuzaki et al. |
| 2005/0002571 A1 | 1/2005 | Hiraga et al. |
| 2005/0229200 A1* | 10/2005 | Kirkland .............. G06F 3/0481 725/12 |
| 2005/0248660 A1 | 11/2005 | Stavely et al. |
| 2006/0013450 A1 | 1/2006 | Shan et al. |
| 2006/0181613 A1 | 8/2006 | Cazier |
| 2007/0047767 A1 | 3/2007 | Watabe |
| 2007/0233579 A1* | 10/2007 | Saarinen et al. ................ 705/26 |
| 2007/0260639 A1 | 11/2007 | Tobin et al. |
| 2007/0296821 A1 | 12/2007 | Kakkori |
| 2008/0060034 A1 | 3/2008 | Egnal et al. |
| 2008/0095448 A1 | 4/2008 | Ono et al. |
| 2008/0118146 A1 | 5/2008 | Cieplinski |
| 2008/0167834 A1* | 7/2008 | Herz .................. G06F 1/3203 702/150 |
| 2008/0240618 A1 | 10/2008 | Chen et al. |
| 2008/0298718 A1 | 12/2008 | Liu et al. |
| 2008/0304753 A1 | 12/2008 | Sohma et al. |
| 2009/0254543 A1 | 10/2009 | Ber et al. |
| 2010/0007601 A1 | 1/2010 | Lashina et al. |
| 2010/0042523 A1 | 2/2010 | Henry et al. |
| 2012/0005046 A1* | 1/2012 | Wu .................. G06Q 30/0643 705/27.2 |
| 2012/0019557 A1 | 1/2012 | Aronsson et al. |
| 2012/0072110 A1 | 3/2012 | Venkatraman |
| 2012/0190385 A1 | 7/2012 | Nair et al. |
| 2012/0242842 A1 | 9/2012 | Yoshigahara et al. |
| 2013/0045751 A1 | 2/2013 | Chao et al. |
| 2013/0054576 A1 | 2/2013 | Karmarkar et al. |
| 2013/0314441 A1 | 11/2013 | Grasset et al. |
| 2013/0322754 A1* | 12/2013 | Lee .................. G06T 7/0081 382/171 |
| 2013/0330003 A1 | 12/2013 | Ivanchenko et al. |
| 2014/0100997 A1* | 4/2014 | Mayerle ............. G06Q 30/0643 705/27.2 |
| 2015/0002665 A1 | 1/2015 | Sentinelli et al. |
| 2015/0161715 A1* | 6/2015 | Rose .................. G06Q 30/0639 705/26.8 |
| 2015/0170418 A1 | 6/2015 | Flynn et al. |

FOREIGN PATENT DOCUMENTS

| | | |
|---|---|---|
| JP | 2004-240692 | 8/2004 |
| JP | 2006-331117 A | 12/2006 |

OTHER PUBLICATIONS

"Final Office Action dated Jan. 30, 2012", U.S. Appl. No. 12/378,599, Jan. 30, 2012, 15 pages.
"Final Office Action dated May 14, 2013", Japan Application 2011-551189, May 14, 2013, 1 page.
"First Office Action dated Feb. 1, 2013", China Application 201080008793.1, Feb. 1, 2013, 25 pages.
"International Search Report dated Mar. 2, 2010", International Application No. PCT/US2010/020943, 14 pages.
"International Search Report dated Mar. 30, 2010", International Application No. PCT/US2010/024466, Mar. 30, 2013, 2 pages.
"International Search Report dated Mar. 5, 2010", International Application No. PCT/US2010/021206, Mar. 5, 2010, 2 pages.
"International Written Opinion dated Mar. 30, 2013", International Application No. PCT/US2010/024466, Mar. 30, 2013, 2 pages.
"Non Final Office Action dated Jan. 8, 2013", Japan Application 2011-551189, Jan. 8, 2013, 2 pages.
"Non Final Office Action dated Apr. 17, 2012", U.S. Appl. No. 12/321,235, Apr. 17, 2012, 6 pages.
"Non Final Office Action dated May 7, 2012", U.S. Appl. No. 12/319,992, 19 pages.
"Non Final Office Action dated Jun. 24, 2011", U.S. Appl. No. 12/378,599, Jun. 24, 2011, 10 pages.
"Non Final Office Action dated Jun. 6, 2012", U.S. Appl. No. 12/321,235, Jun. 6, 2012, 29 pages.
"Notice of Allowance dated Oct. 26, 2012", U.S. Appl. No. 12/319,992, 7 pages.
"Notice of Allowance dated Nov. 29, 2012", U.S. Appl. No. 12/321,235, Nov. 29, 2012, 14 pages.
"Notice of Allowance dated Jul. 29, 2013", U.S. Appl. No. 13/491,398.
Baatz, Georges et al., "Handling Urban Location Recognition as a 2D Homothetic Problem", http://www.inf.ethz.ch/personal/pomarc/pubs/BaatzECCV10.pdf, 14 pages.
Baumberg, Adam, "Reliable Feature Matching Across Widely Separated Views", Proceedings of Computer Vision and Pattern Recognition, vol. 1, 2000, pp. 1774-1781.
Berretti, Stefano et al., "Merging Results for Distributed Content Based Image Retrieval", Multimedia Tools and Applications, Kluwer Academic Publishers, vol. 24; No. 3, Dec. 1, 2004, pp. 215-232.
Chen, David M. et al., "City-Scale Landmark Identification on Mobile Devices", http://www.inf.ethz.ch/personal/gbaatz/papers/chen11.pdf, 8 pages.
Cheng, Liang et al., "Robust Affine Invariant Feature Extraction for Image Matching", IEEE Geoscience and Remote Sensing Letters, vol. 5, No. 2, 2008, 5 pages.
Chu, et al., "Image-guided tours: Fast-approximated sift with u-surf features", Technical report, Stanford University, Department of Electrical Engineering, 2007.
Fischler, Martin A. et al., "Random Sample Consensus: A Paradigm for Model Fitting with Applications to Image Analysis and Automated Cartography", Communications of the ACM, vol. 24, 1981, pp. 381-395.
Jia, et al., "Photo-to-Search: Using Camera Phones to Inquire of the Surrounding World", Proceedings of the 7th International Conference on Mobile Data Management (MDM '06), 2006.
Labe, T. et al., "Automatic Relative Orientation of Images", Proceedings of the Fifth Turkish-German Joint Geodetic Days, Berlin, Germany, 2006, 6 pages.
Lowe, David G., "Distinctive Image Features from Scale-Invariant Keypoints", Jan. 5, 2004, 28 pages.
Lowe, David G., "Distinctive Image Features from Scale-Invariant Keypoints", International Journal of Computer Vision, 2004, pp. 910-110.
Paiva, "Topological Equivalence and Similarity in Multi-Representation Geographic Databases", The University of Maine—Electronic Theses and Dissertations, 1998.
Philbin, James et al., "Object Retrieval with Large Vocabularies and Fast Spatial Matching", Proceedings of Computer Vision and Pattern Recognition, 2007, 9 pages.
Schmid, Cordelia et al., "Local Grayvalue Invariants for Image Retrieval", IEEE Transactions on Pattern Analysis and Machine Intelligence, vol. 19, May 5, 1997, pp. 530-535.
Wang, Yizhou et al., "Object Recognition Using Multi-View Imaging", Signal Processing, ICSP 2008, Ninth International Conference on IEEE, Piscataway, New Jersey, Oct. 26, 2008, pp. 810-813.
Winder, Simon A. et al., "Learning Local Image Descriptors", Proceedings of Computer Vision and Pattern Recognition, 2007.
Winder, Simon A. et al., "Learning Local Image Descriptors", Proceedings of Computer Vision and Pattern Recognition, 2007, 8 pages.
Zheng, Yu et al., "Distributed Architecture for Large Scale Image-Based Search", Multimedia and Expo, 2007 IEEE International Conference, Jul. 1, 2007, pp. 579-582.

(56) References Cited

OTHER PUBLICATIONS

US Non-Final Office Action dated Apr. 23, 2015 issued in U.S. Appl. No. 13/842,433.
US Non-Final Office Action dated Mar. 27, 2015 issued in U.S. Appl. No. 13/750,940.
US Non-Final Office Action dated Oct. 15, 2015 issued in U.S. Appl. No. 14/307,090, 26 pages.
US Final Office Action dated Apr. 7, 2016 issued in U.S. Appl. No. 14/307,090, 27 pages.
US Notice of Allowance dated Oct. 5, 2015 issued in U.S. Appl. No. 13/842,433, 7 pages.
US Notice of Allowance dated Feb. 1, 2016 issued in U.S. Appl. No. 13/750,940, 8 pages.
US Final Office Action dated Oct. 23, 2015 issued in U.S. Appl. No. 13/750,940, 31 pages.

* cited by examiner

VISUAL SEARCH IN A CONTROLLED SHOPPING ENVIRONMENT

BACKGROUND

When a customer is shopping in a store, that customer may want to evaluate merchandise and determine its specific attributes (e.g., color, texture and/or quality) before making a purchasing decision. Often times an exact item (e.g., a specific brand, size, quantities, color or texture) may not be readily available within view of the customer. The customer may have to look for the item in the entire store or ask a store associate for help, but store associates may be unavailable or may be helping other customers. Such a search can be very time consuming and frustrating. Sometimes, the customer may give up and abandon the search even though the item may be available on a nearby shelf in the store.

BRIEF DESCRIPTION OF THE DRAWINGS

Various embodiments in accordance with the present disclosure will be described with reference to the drawings, in which.

DETAILED DESCRIPTION

Figure 1A:
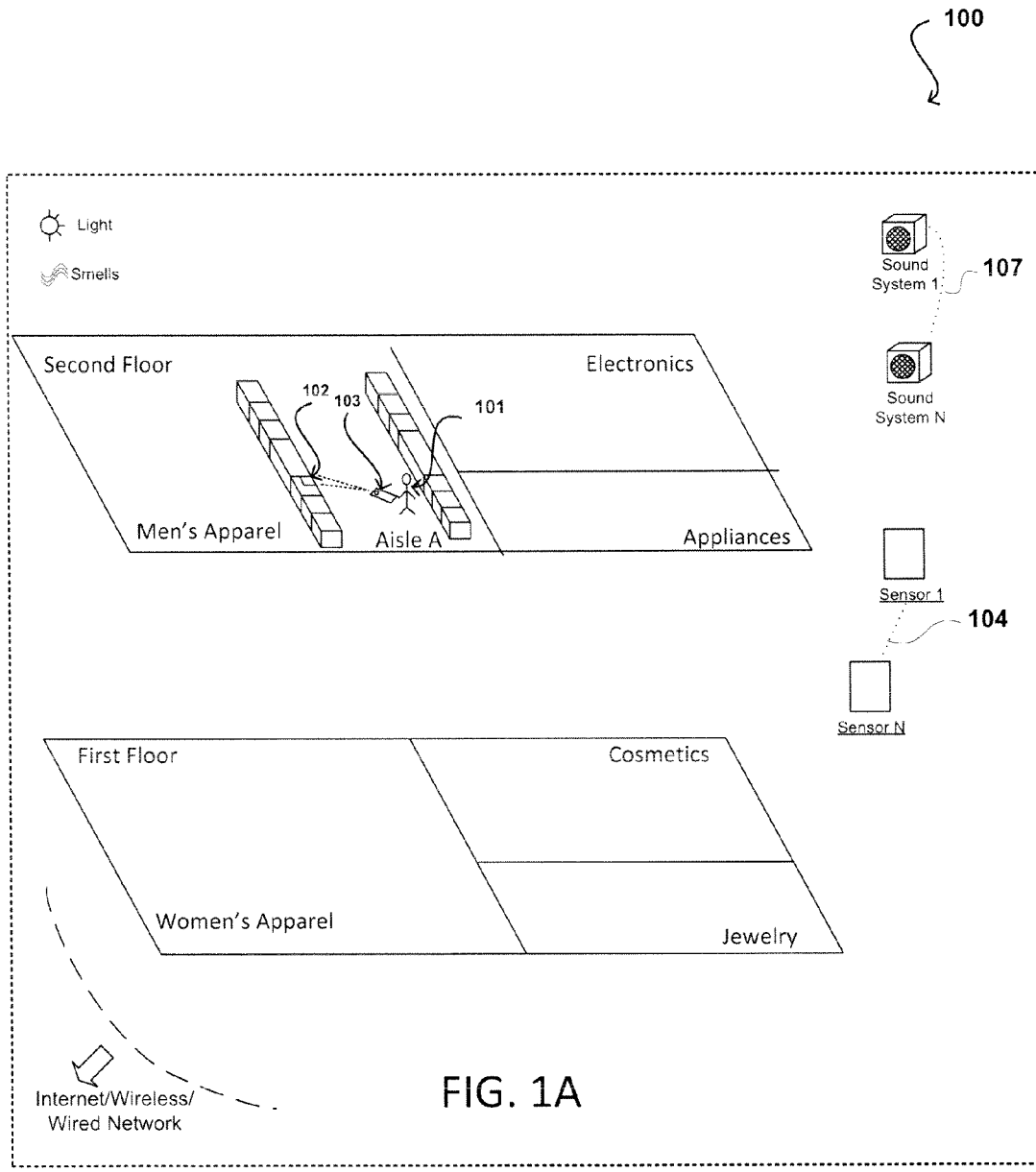
FIG. 1A illustrates an example of visual search in a controlled shopping environment in accordance with various embodiments.

Systems and methods in accordance with various embodiments of the present disclosure overcome one or more of the above-referenced and other deficiencies in conventional approaches to locating a specific item or related items in a controlled environment. More specifically, various embodiments of the present disclosure enable a customer to quickly find a specific product and additional information (e.g. sizes, color and availability either in store or online) related to the specific product through a computing device. In many cases, a location of the customer in a shopping and/or store environment can be determined when the customer requests additional product information. In many instances, additional product information requested by a customer can be matched at least based on a location of the customer and product information provided by the customer.

In some embodiments, a location of a customer in a controlled shopping environment can be determined by one or more sensors embedded in a computing device of the customer. For example, sensors, such as a GPS, accelerometer, and/or compass, can be utilized to track the customer's location in the store. In some instances, when the customer enters the store, an application on the computing device can start to track the customer's location either automatically or in response to the customer's interaction.

Some embodiments determine location of a customer in a controlled shopping environment using sensors and devices calibrated and placed throughout the store. For example, a location of the customer can be tracked using security cameras in the store. In many instances, the location of the customer can be determined by triangulating network signals from Wi-Fi or Bluetooth transmitters calibrated and placed throughout the store. In some instances, infrared (IR) and inertial sensors placed in the store can be used to assist locating the customer in the store.

In at least one embodiment, a location of a customer can be determined by analyzing image and sound data from a computing device of the customer. For example, store image(s) or features captured by the computing device can be matched against stored images and physical layout and dimensions of the store to locate the customer. Various image processing algorithms and text recognition techniques can be used to match the local store image(s) or features to a specific location in the store. For another example, sound waves captured by the computing device can be compared with pre-learned sound patterns in the store to determine location of the customer. In many instances, the customer can aid localization by speaking voice command to the computing device, and/or scanning 1D or 2D barcodes through devices placed in the store.

Various embodiments analyze a product request from a customer and return to the customer a list of search results with additional information related to a specific product. In some embodiments, the product request may include a product image taken by the customer. Many embodiments provide imaging processing algorithms and text identification/recognition techniques to match the product image against products currently offered in the store. For example, optical character recognition (OCR) can be used as a primary image analysis technique or to enhance other processes. Features (e.g., shape, size, color and text) of the product can be extracted and matched against products placed or determined in the areas of the customer's location. In some instances, the size dimensions of the specific product can be analyzed when the product image is captured by a computing device having a depth sensor. In some other instances, only a predetermined number of products in the vicinity of the customer's location are matched to optimize searching experience. In one embodiment, searched products can be narrowed down to items in a specific 3D area (e.g., a shelf, container, booth and stall) that the customer is currently viewing.

In some embodiments, a location of a customer in a store can be constantly tracked. Information related to products close to the customer's present location can be pre-fetched on a computing device of the customer. Different search algorithms can be selected and used in matching processes based on specific product areas that the customer is located. For example, match algorithms suited for books and DVDs can be used if the customer is in books and DVD areas.

In at least one embodiment, different options are provided for presenting search results of additional product information on a computing device. In some instances, only the top search result or a ranked list of search results is presented to the customer. The ranked search results can be determined based on relevancy to the specific product inquired by the customer. In some embodiments, each attribute of the search results presented to the customer may include a hyperlink, which enables the customer to select a refinement to the search results corresponding to a selected attribute. In some other embodiments, the hyperlink associated with each attribute of the search results may enable the customer to modify a search by adjusting parameters corresponding to a specific attribute.

In some embodiments, 3D layout/dimensions of a store, product information (e.g., all products' visual aspects, dimensionalities and inventories and where all products are placed throughout the store) and search algorithms can be downloaded onto a computing device of a customer for offline use. The customer can search a specific product in the store without an internet connection. In some embodiments, search results provided to a customer in a controlled shopping environment can take into account locations of items that have been scanned by other customers and/or items that have already been placed in other customers' shopping carts. In some embodiments, the product search processes may count in products that have been previously scanned or in the vicinity of the customer's path throughout the store, the customer's characteristic information (e.g., shopping pattern and preferences in brand, color, texture, size and other attributes of similar products) and other factors (e.g., promotions, coupons and popularity of products).

Various other functions and advantages are described and suggested below as may be provided in accordance with the various embodiments.

Figure 1B:
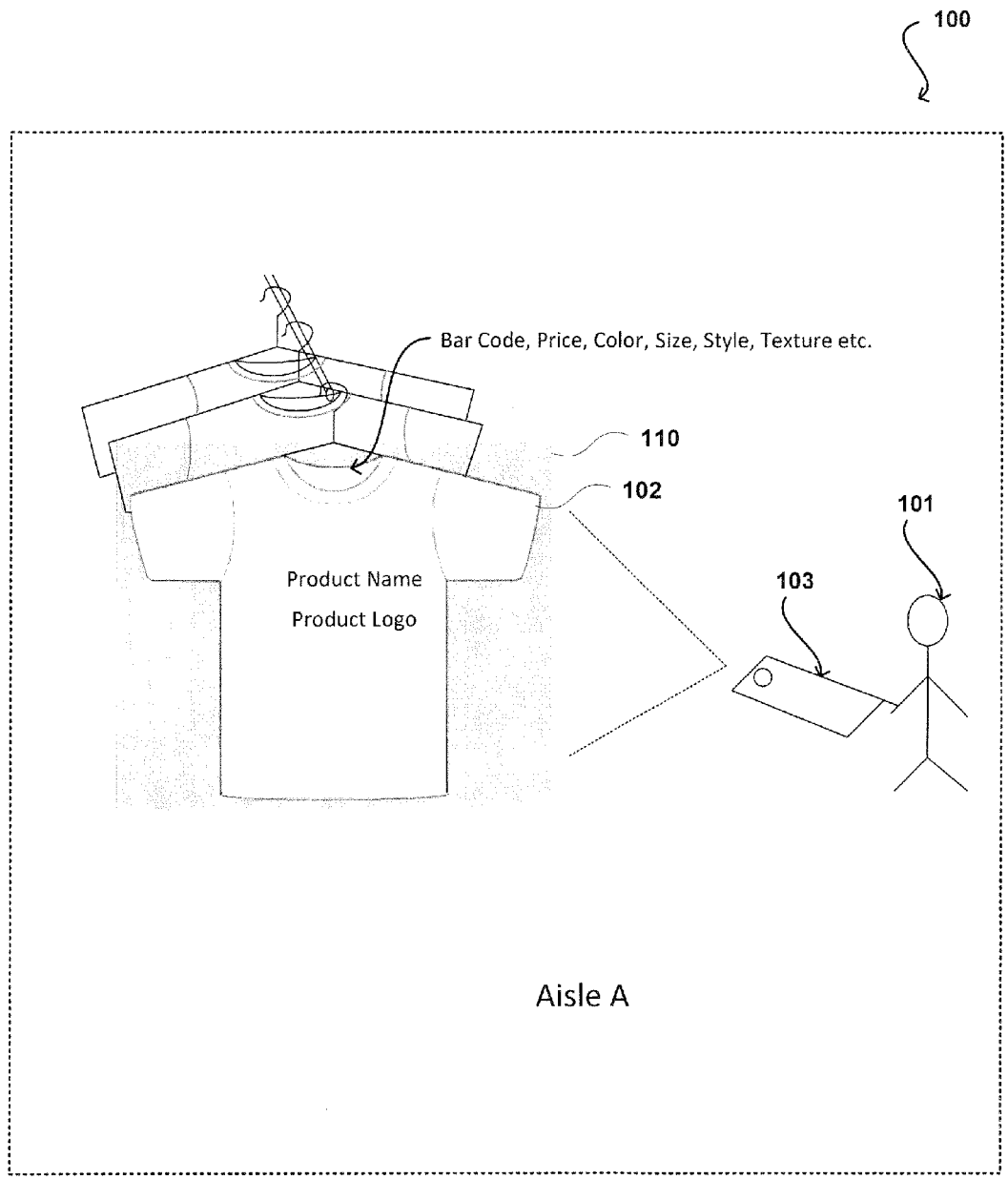
FIG. 1B illustrates an example of product image captured by a computing device in accordance with various embodiments.

FIGS. 1A and 1B illustrate an example of visual search in a controlled shopping environment in accordance with one embodiment of the present disclosure. In this example, a customer 101 can be seen operating a computing device 103 in a controlled shopping environment 100. Although a portable computing device is shown, it should be understood that any device capable of receiving input from and providing output to the customer 101 can be used in accordance with various embodiments discussed herein. By way of examples, the devices can include a laptop computer, a portable media player, an e-book reader, a personal digital assistant (PDA), a portable computer, a tablet PC, a head-mounted display, a wearable computer, an interactive kiosk, a mobile phone, a single-board computer (SBC), an embedded computer system, a wearable computer (e.g., a watch or glasses), or a combination of two or more of these. In this example, the customer 101 has interest in a specific product 102 in Aisle A of Men's Apparel Department on the Second Floor of the store 100. The specific product 102 may be a conventional item with a complete store tag or an irregular item with incomplete or no store-identified information (e.g., an item missing barcodes or product packaging, a model item without a barcode, an item out of reach, or an item difficult to be removed from a shelf). The customer 101 can use the computing device 103 to search for the specific product by inputting information related to the specific product 102, or taking a snapshot of the specific product 102 or an image of the specific product 102 (e.g., an advertisement). A matched product and/or related products in the store 100 can be located and the user presented with additional information of the matched product, such as, but not limited to, product name, bar code, price with ongoing promotion and discount, color and size options, model number, location and availability (e.g., current inventory in store, online or in other stores).

In some embodiments, the customer 101 can initiate an inquiry of the specific product 102 by a user interface provided on the computing device 103. The user interface may prompt the customer 101 to input available information of the specific product 102 or take a snapshot of the specific product 102. As illustrated in FIG. 1A, the snapshot taken or input received from the customer 101 can include parameters related to the specific products 102 such as, a bar code, price, color, size, style, texture, product name, product logo etc. In some instances, the computing device 103 includes a depth sensor. The snapshot of the specific product 102 can include three-dimensional information of the specific product 102 or a package of the specific product 102. In some embodiments, product searches are circumscribed or limited to products within vicinity of determined location of the customer 101. By limiting or filtering the products to be matched or searched, amount of processing time and accuracy of the customer's inquiry can be greatly improved.

In some instances, a location of the customer 101 can be determined using a plurality of sensors 104 (e.g., security cameras) calibrated and placed throughout the store 100. In some embodiments, a 3D layout, dimensions, GPS coordinates, and/or in-store visual information of the store 100 can be used to aid in locating the customer 101 and visual search of the specific product 102. For example, a 3D layout and dimensions of the store 101 can include information related to multiple floor layouts, departments, shelving units, walls, ceilings, and lighting fixtures etc. For another example, in-store visual information can include "street-view" images (e.g., entire shelves or hallways images) and 3D Lidar data. The "street-view" images may include large and small scale images as well as images zoomed in to specific products on shelves. In some embodiments, the layout of networks in the store 100 can also be used to locate the customer 101. For example, WiFi and/or Bluetooth transmitters can be calibrated and placed throughout the store 100. A location of the customer 101 can be determined by analyzing signal strength from the computing device 103 by using triangulation, trilateration, time of flight or other suitable algorithms for distance calculation.

In some embodiments, geolocation sensor data from the computing device 103 can be used to determine the customer 101's location in the store 100. For example, sensor data, such as from a GPS, accelerometer and/or compass of the computing device 103 can be compared with GPS coordinates of the store 100 to determine a precise location of the customer 101. In some instances, sensor data from a GPS, accelerometer and/or compass can be used to determine the orientation and position of the computing device 103, thereby determining shelf information for the specific product 102. In some implementations, altitude data from sensors such as a barometer or altimeter can be utilized to determine which floor the customer 101 is located in the store 100 and/or location of the specific product 102 on the shelf.

Some embodiments determine the location of the customer 101 based at least in part on a background image of the specific product 102 and/or other images captured by the computing device 103. A background image containing in-store features can be analyzed and matched against the 3D layout/dimensions and in-store visual features of the store 101 to determine the location correlated to the captured background image or images. In some embodiments, the location of the customer 101 can be determined based on at least one video frame from the computing device 103. In many instances, image matching to determine the location of the customer 101 can include sub-processes such as feature extraction and feature matching. Image matching can be performed on the computing device 103. In other instances, image matching can be performed by a remoter server at least partially based on images or video and/or other sensor data streamed from the computing device 103.

In this example, the store 101 also includes a plurality of sound systems 107. The plurality of sound systems 107 can be calibrated and disposed throughout the store 101. One or more microphones or other audio capture devices of the computing device 103 can be used to capture sound from the plurality of sound systems 107 and determine location of the computing device 103 based on captured sound from these pre-positioned sound systems 107. In some embodiments, the one or more microphones can be directional microphone (e.g., Unidirectional, Bi-directional, Cardioid and Shotgun microphone) to capture sound information from one or more directions correlating to the face of the computing device 103. In some instances, two or more microphones on the computing device 103 can capture sound information from different angles and provide more accurate location information of the computing device 103.

In some embodiments, additional information from the customer 101 can be used in determining the customer's location. For example, a voice command from the customer 101 may aid the determination process of the customer 101's location. In at least one embodiment, two or more cameras can be embedded in the computing device 103 to provide additional image(s) captured at the location of the customer 101. One of the two or more cameras may be facing the customer 101 to provide an image of the store 100 facing the customer 101. In some instances, one of the cameras may provide a wide-angle image of the store 100 from the location of the customer 101, which can be used to narrow down the customer 101's location.

In this example, ambient lighting patterns in the store 100 can be pre-learnt or dynamically learned through sensors placed throughout the store. For example, different sections of the store 100 may be designed with different light patterns for lighting and/or creating an environment that is consistent with the types or brands of merchandises in the corresponding sections. Background lighting pattern of image(s) taken by the computing device 103 can be compared with the ambient lighting patterns throughout the store 100 to localize the customer 101. In some embodiments, smell patterns in different sections of the store 100 can also be pre-learnt and stored. For example, the store 100 may have a smell of fresh baking bread for bakery section, a sweet smell of chocolate chip cookies for candy section or a smell of ocean for luggage section. Data from a smell sensor of the computing device 103 can be compared with the smell patterns of the store 100 to pinpoint location of the customer 101. Various other types of methods to localize the customer 101 are also possible, some of which are discussed in further detail elsewhere herein.

In some embodiments, a complete catalogue and inventory information of items that the store 100 sells and location that each of these items is placed are maintained and stored in a database. In many instances, the inventory information of items can be dynamically maintained by taking into account items that have been checked out by other customers. In some instances, items placed in other customers' shopping carts can be automatically tracked and dynamically deducted from available inventory of these corresponding items. In some other instances, customers are provided options to explicitly specify products added to their shopping carts.

In the example of FIG. 1B, the snapshot 110 of the specific product 102 can be captured by pointing the computing device 103 at a barcode or any surface of the specific product 102. Image and text analysis can be performed to match captured product features and/or barcode against information stored in a product and inventory database. The information may include store products' visual aspects, dimensionalities and inventories, where these products are placed throughout the store, and other such information related to products in the store. Many embodiments utilize various image processing algorithms and text identification and recognition techniques to match the snapshot 110 against stored product information in a database.

In some embodiments, product image and text matching can include sub-processes such as feature extraction and feature matching. Images and text in the real world come in many colors, shapes, font types that can be skewed, blurry, of different sizes, and the like. Feature extraction techniques include various approaches to detect and define characteristics of an image or segments of an image. The output of such techniques can sometimes be referred to as feature descriptors or signatures. Features herein are not limited to computer vision features, but also include other types of features such as product's features, colors, shapes etc. Features can be local, i.e., describe discrete portions of an image, or global, i.e., represent the entire image. In local feature extraction, processes can include approaches to segment the image. Such approaches can be based on active contours (e.g., snakes, scissors, level sets), graph-based merging (e.g., watershed, divisive clustering, agglomerative clustering, graph-based segmentation, probabilistic aggregation), mean shift and mode finding (e.g., k-means and mixtures of Gaussians), normalized cuts, graph cuts, etc. Product image features can be extracted globally or locally according to color, texture, shape, other salient features, or some combination thereof. Feature extraction based on color can involve calculating histograms for the color components of an image (e.g., red, green, and blue intensities). Texture features include the granularity and repetitive patterns of surfaces within an image. For example, glass, brick, and wood differ in texture, smoothness as well as pattern, and such characteristics can be used to describe an image or regions of the image. Texture features can be extracted according to co-occurrence matrices, Tamura's features (e.g., coarseness, contrast, directionality, line-likeness, regularity, roughness), wold features (e.g., periodicity, randomness, and directionality), Gabor filtering, wavelet transforms, etc. Shape features for an image can be extracted according to aspect ratio, circularity, Fourier descriptors, moment invariants, consecutive boundary segments, etc. Other salient features include edges (extracted using, e.g., Canny edge detection), corners (extracted using, e.g., Harris corner detection or Smallest Univalue Segment Assimilating Nucleus (SUSAN) corner detection), regions of interest (extracted using, e.g., LaPlacian of Gaussian pyramids or Difference of Gaussian pyramids), or some combination and/or variation thereof, such as Scale Invariant Feature Transform (SIFT) features.

Various feature matching methods can be used to assess the similarity between images. Similarity measures can depend on the feature descriptors or signatures selected from an image. In one embodiment, similarity measures include the Minkowski distance or the Mahalanobis distance. The Minkowski distance may be appropriate where feature vectors are independent and each feature vector is of equal importance. For example, if $D(I, J)$ is denoted as the distance between a captured image I and a database image J and $f_i(I)$ is the number of features in a bin i of I, the Minkowski distance is defined as:

$$D(I, J) = \left( \sum_i |f_i(I) - f_i(J)|^p \right)^{1/p}$$

where p=1, 2, and ∞, D(I, J) is the $L_1$ distance (also sometimes called the Manhattan distance), $L_2$ distance (also known as the Euclidean distance), and $L_\infty$ (also called the Chebyshev distance), respectively. The Mahalanobis distance may be appropriate when each dimension of the feature vector is dependent of each other and is of different importance. The Mahalanobis distance is defined as:

$$D(I, J) = \sqrt{(F_I - F_J)^T C^{-1} (F_I - F_J)}$$

where C is the covariance matrix of the feature vectors, $F_I$ and $F_J$, are vectors that list all the entries in $f_i(I)$ and $f_i(J)$.

In another embodiment, similarity measures include the Quadratic Form distance, the Kullback-Leibler divergence, the Jeffrey divergence, the Hausdorff distance, the Mallows distance, the earth mover's distance, the integrated region matching distance, or variations thereof. Certain embodiments may use various indexing structures or techniques for efficiently searching the image database, including multi-dimensional hashing, which maps feature descriptors into fix-sized bins or buckets based on some function applied to each descriptor vector; locality sensitive hashing, which uses unions of independently computed hashing functions to index features; multi-dimensional search trees such as k-d trees, which divide the multi-dimensional feature space along alternating axis-aligned hyperplanes to maximize search tree balance; etc. When there are hypothetical or putative matches, techniques such as geometric alignment can be used to verify which matches are inliers and which ones are outliers. In some instances, the entire query image can be expected to be translated or rotated to match an image in the database image such that the query image can be geometrically transformed to keep only those feature matches that are sufficiently close to the estimated transformation. Processes such as random consensus sampling (RANSAC) or least median of squares (LMS) can be used for verification.

In some embodiments, image and text processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns). Various techniques (e.g., OCR and other text recognition processes) can be used as the primary image and text analysis technique or to enhance other processes. Some techniques are described in co-pending U.S. patent application Ser. No. 13/491,398, filed Jun. 7, 2012, entitled "Adaptive Thresholding For Image Recognition," co-pending U.S. patent application Ser. No. 13/842,433, filed Mar. 15, 2013, entitled "Semi-Structured Text Entity Recognition From Natural Scene Images," and co-pending U.S. patent application Ser. No. 13/750,940, filed Jan. 25, 2013, entitled "Single Point of Interest Search Application With a Mobile Device," which are hereby incorporated herein by references in their entirety.

In some embodiments, a location of a customer in the controlled shopping environment 100 can be dynamically tracked. Information of products near location of a customer in a controlled shopping environment can be pre-loaded onto a computing device of a customer based on the determined location of the customer. In some instances, based on the determined location of the customer and product categories/departments associated with the location, one or more suitable search algorithms for the product categories/departments can be selected and applied in the search process. For example, a suitable algorithm for clothing and deformable items can be used when the customer is determined in clothing or shoes areas. In some other instances, the product search process can cycle through different algorithms and provide search results weighed based on the associated product categories/departments.

In some embodiments, 3D layout/dimensions and product information of a store and search algorithms can be downloaded onto a computing device of a customer for offline use. The customer can search a specific product in the store by a user interface provided on the computing device 103 even without an internet connection. In some instances, a portion of products or product information and related search algorithms are pre-loaded onto the computing device of the customer based on the customer's past shopping patterns or other characteristic information. Some embodiments provide options for the customer to switch between offline or online mode and trade data usage for algorithmic improvements. In many instances, switch between offline and online mode can be automatically when network is detected or out of range.

Figure 2:
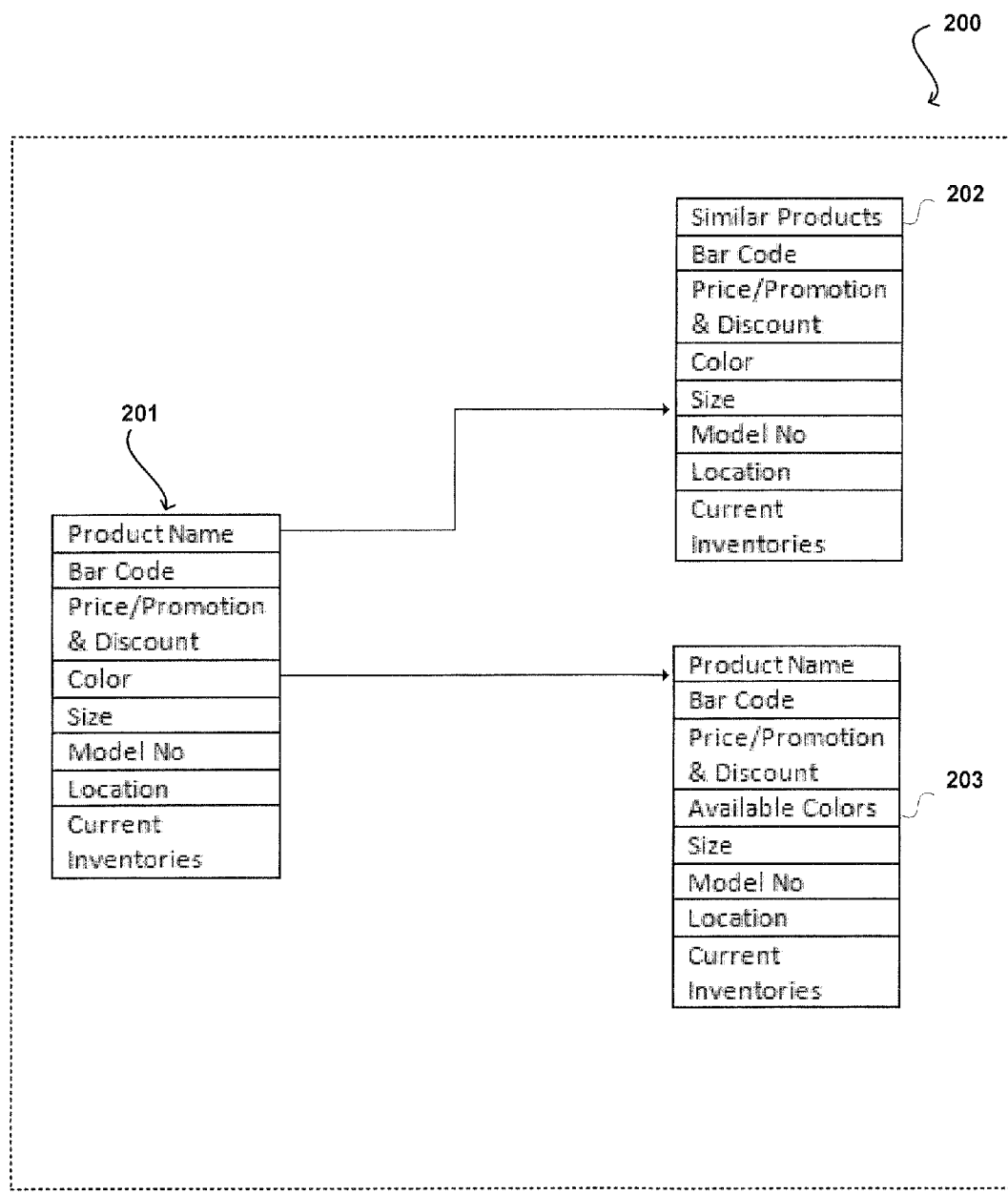
FIG. 2 illustrates an example of visual search results displayed on a computing device in accordance with various embodiments.

FIG. 2 illustrates an example of visual search results 200 displayed on a computing device, in which various options can be provided to present a customer search results of a specific product. In this example, the top search result 201 or a ranked list of search results can be presented to the customer. The ranked search results can be determined based on relevancy to the specific product inquired by the customer. In some instances, only search results above a threshold score in relevancy are provided for presentation on the computing device. The search result 201 may include product attributes such as product name, bar code, price/promotion/special deals, color, size, model number, location and availability either in this store, other stores or online.

In some embodiments, each attribute of the search results presented to the customer may include a hyperlink, which enables the customer to select a refinement to the search results correlated to the selected attribute. For example, by selecting "Product Name" attribute in the search result 201, a list of similar products with the same or similar product attributes (e.g., color and size) can be presented to the customer in a refined search result 202. For another example, the hype-link to the "Color" attribute" can provide the customer a refined search result 203 with available color options for the searched products. In another embodiment, location attribute of the search results 201, 202 and 203 not only provides location of the associated products but may also provide directions from the customer's current location to these products' present locations.

In some other embodiments, the hyperlinks associated with attributes of the search results may enable the customer to adjust parameters corresponding to these attributes. The customer can choose to expand or narrow down the search results by modifying parameters of the desired product attribute.

Figure 3:
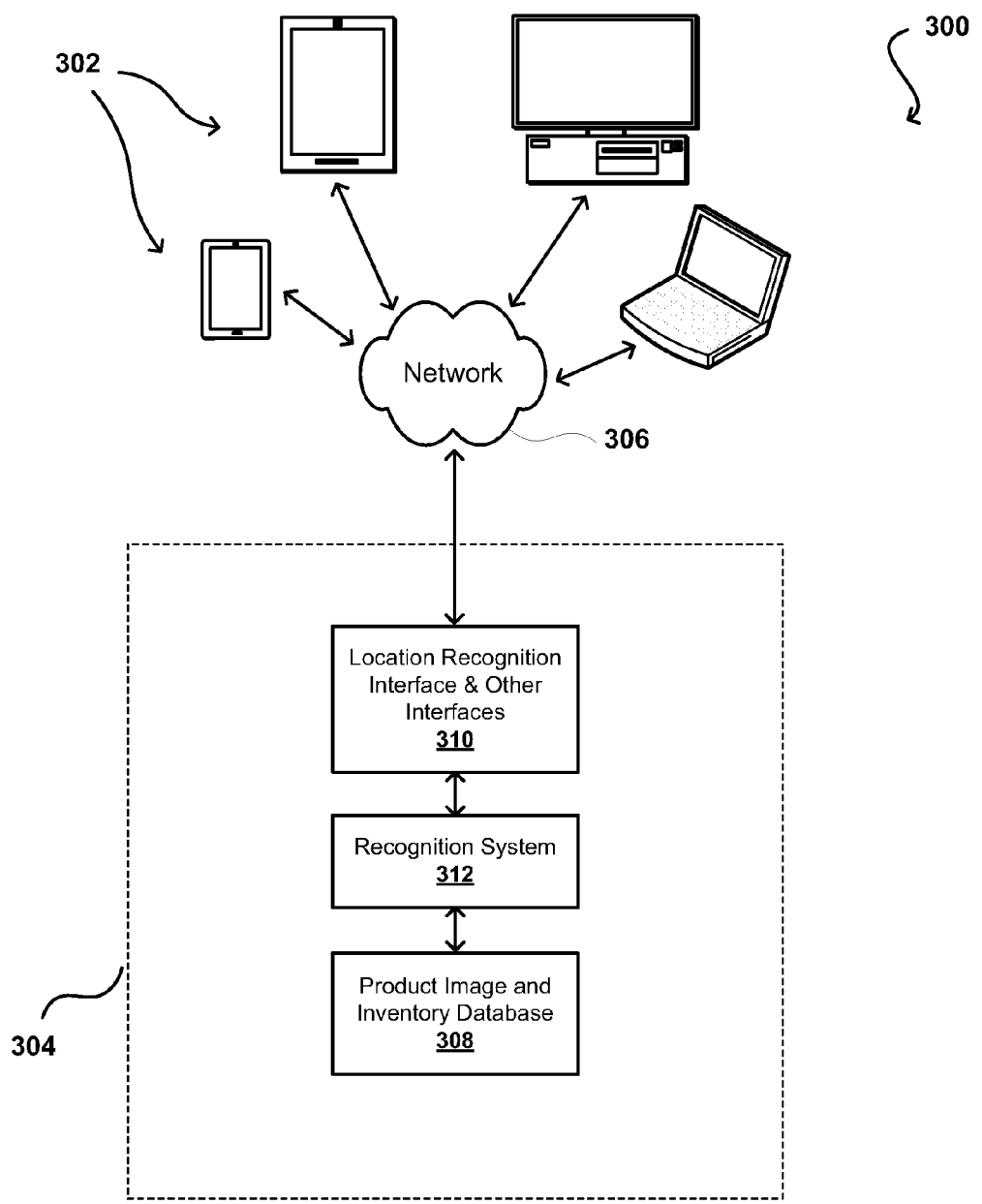
FIG. 3 illustrates an example system for managing visual searches in a controlled shopping environment that can be used in accordance with various embodiments.

FIG. 3 illustrates an example of an environment 300 in which various aspects of the embodiments can be implemented and/or utilized. In this example, a customer is able to use a computing device 302 to search specific product information from a shopping environment 304 over at least one wired and/or wireless network 306, such as the Internet, an Intranet, a cellular network, a local area network (LAN), and the like. In at least some embodiments, the request will be received to a location recognition interface layer or other interface layers 310 of the shopping environment 304, which can determine location of the customer in the shopping environment and direct information for the request to one or more appropriate product recognition system 312 configured to match the specific product information against products in the vicinity of the customer's location and return a top search research or a ranked list of all search results, for example, enabling the customer's computing device 302 to display content for at least one item of interest corresponding to the specific product. In at least some embodiments, the product recognition system 312 can pull data from one or more product image and inventory database 308, wherein the data can include information about all products' visual aspects, dimensionalities and inventories, where these products are placed throughout the store, and other such information. In some embodiments, the data also includes 3D layout, dimensions, GPS coordinates, and/or in-store visual information of the store. The product recognition system 312 and/or components of the interface layer 310, as may include one or more servers or other such components, can cause the product search result to be sent to the computing device 302 for presentation to the customer. Approaches for receiving product search requests and serving content to a computing device are well known in the art and, as such, will not be discussed herein in detail.

In some embodiments, the shopping environment 300 can also include a management server or other such component or service configured to manage aspects of the shopping store, such inventory information, accounting, and the like. In some instances, the management server can track and monitor the dynamic inventory information that includes items purchased by customers in the shopping and/or items placed in shopping carts of in-store customers. The management server can store the information in one or more database, which can be the same as, or at least partially separate from, the product image and inventory database 308. Some embodiments provide option to pre-loaded store information, product/inventory information and related search algorithms on the computing device 302 for offline use.

Figure 4:
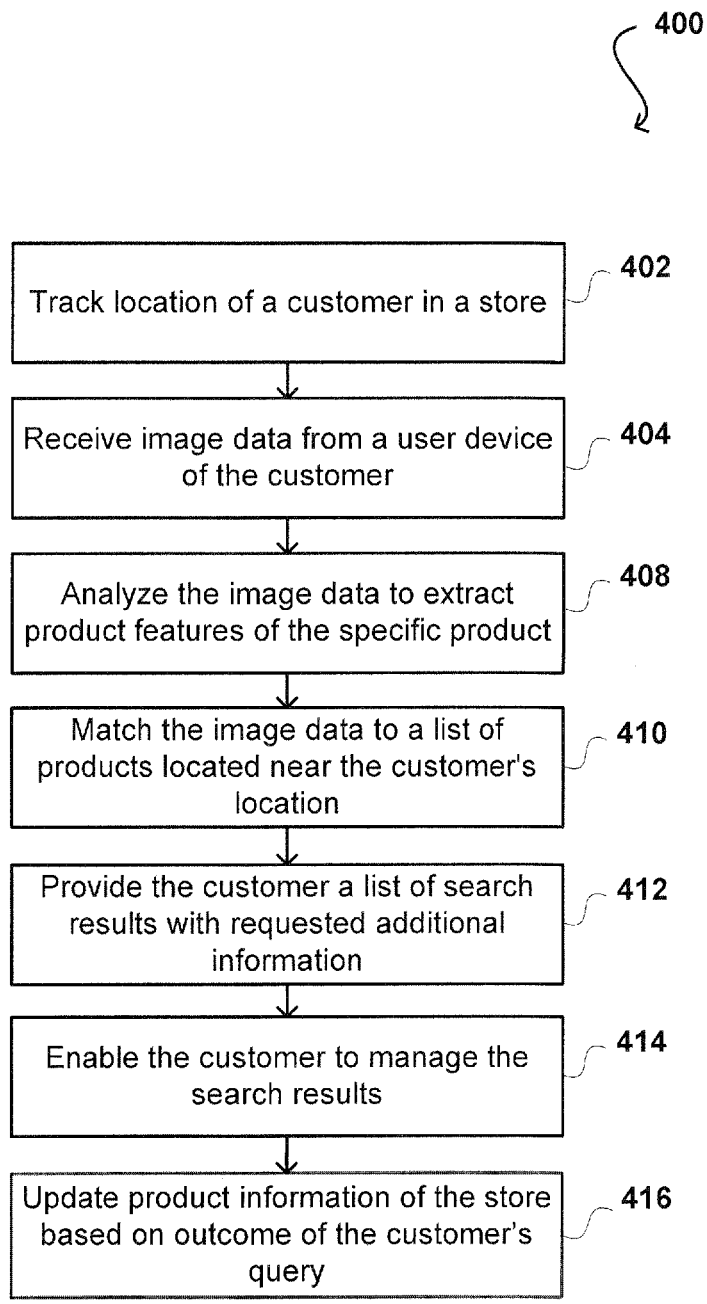
FIG. 4 illustrates an example process for managing visual searches in a controlled shopping environment that can be utilized in accordance with various embodiments.

FIG. 4 illustrates an example process 400 for managing visual searches in a controlled shopping environment that can be utilized in accordance with various embodiments. It should be understood that there can be additional, fewer, or alternative steps performed in similar or alternative orders, or in parallel, within the scope of the various embodiments unless otherwise stated. In this example, location of a customer can be tracked in a controlled shopping environment 402 by starting an application on a computing device of the customer. The application can automatically start when the customer enters the store. In some instances, the application only starts through user interactions. In some other instances, a customer's location can be tracked when a computing device of the customer has been linked to security feeds in a store. An image data of a specific product are received 404 from a user device of the customer. The specific product may have missing barcode, lost product packaging, hard-to-be found barcode and difficult to be removed from the shelf, out of reach but complete visible. In some instance, the specific product may be an item on a store model with no barcode or price information or the customer simply wants a quick search of similar items related to a specific product. The customer can use a camera-enable computing device to take an image of any surface of the specific product. In some embodiments, the image data can be analyzed to confirm or determine the location of the customer in the controlled shopping environment.

Many embodiments provide techniques to determine location of a customer in the controlled shopping environment. In some embodiments, location of the customer can be determined by sensors (e.g., surveillance cameras, IR and inertial sensors) and Wi-Fi or Bluetooth transmitters that are calibrated and placed in the store. In some embodiments, location of the customer can be determined by sensors (e.g., GPS, Accelerometer and Compass) embedded in a computing device of the customer. In some embodiments, image, audio and/or smell data from a computing device of the customer can be analyzed and matched against predetermined patterns of the store to determine location of the customer. In some embodiments, background store features in the image data taken by the customer can be extracted and used to match a specific location in the store.

The image data related to the specific product can be analyzed 408 to extract features of the specific product according to one or more search algorithms that are suitable for product categories located or determined in the vicinity of the customer's location. Various imaging processing, text identification and recognition algorithms can be used to analyze and extract features (e.g., text, color, size and shape) of the specific product. Extracted product features are matched 410 against products in the area of the customer's location. A list of search results with requested product information can be provided 412 to a computing device for presentation to the customer. Some embodiments 414 enable the customer to manage the search results. For example, the customer can adjust parameters of product attribute in the search results. By adjusting parameters of a specific product attribute, the customer can expand or narrow down the search results corresponding to the specific product attribute. In some embodiments, a hyperlink to a specific product attribute enables the customer to view similar products having variations of the specific product attribute. Product information of the store can be updated 416 based on the outcome of the customer's query. The image data can be saved for future matching against images taken by other customers' in the store. Various other options exist as well within the scope of the various embodiments.

Figure 5A:
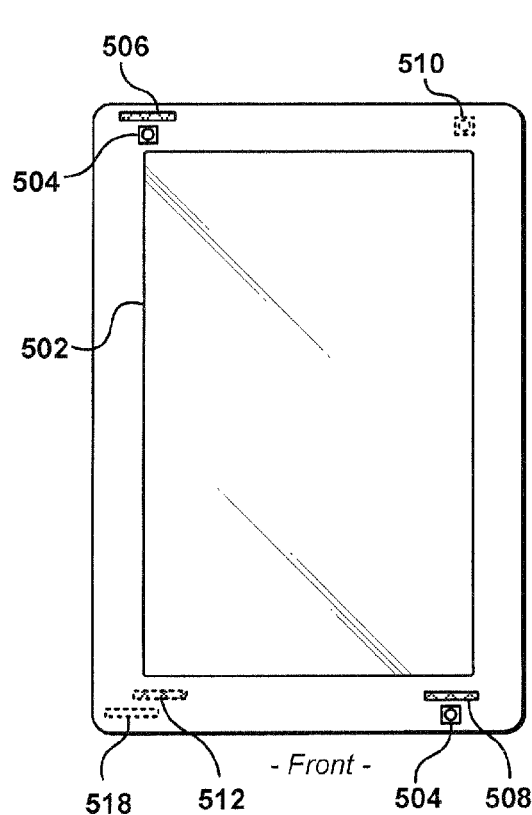
FIG. 5A and FIG. 5B illustrates an example computing device that can be used to implement aspects of the various embodiments.
Figure 5B:
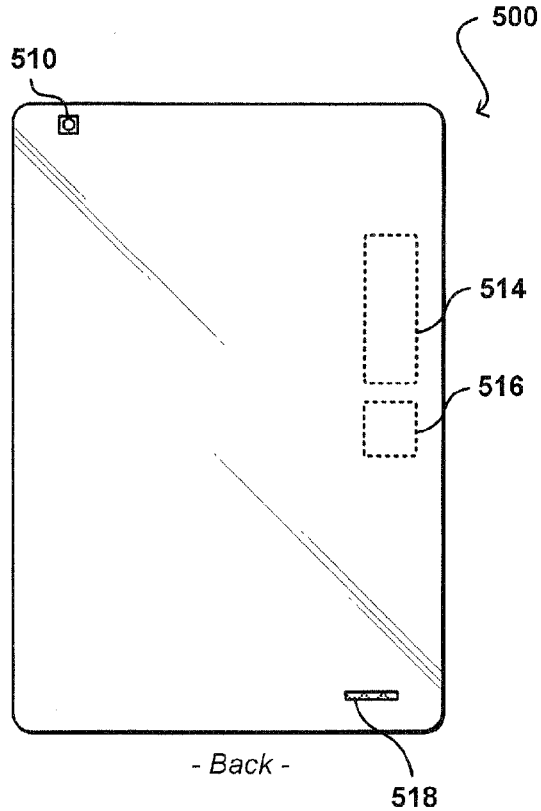

FIGS. 5A and 5B illustrate front and back views, respectively, of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one computing mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
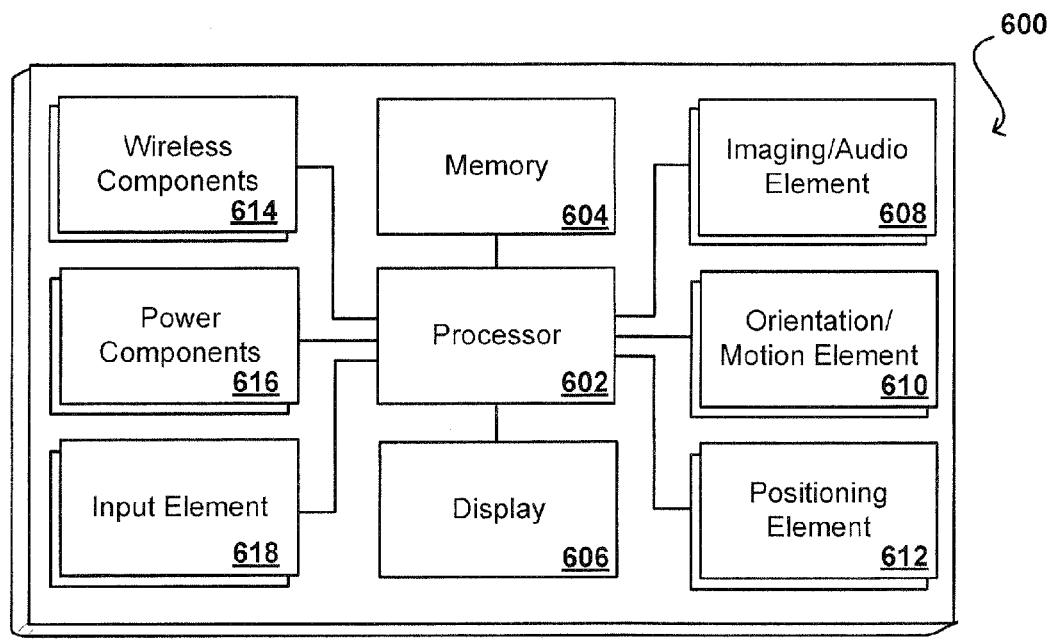
FIG. 6 illustrates example components of a computing device such as that illustrated in FIG. 5A and FIG. 5B.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of computing approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging/audio element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation/motion determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command or a request for additional product information to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 7:
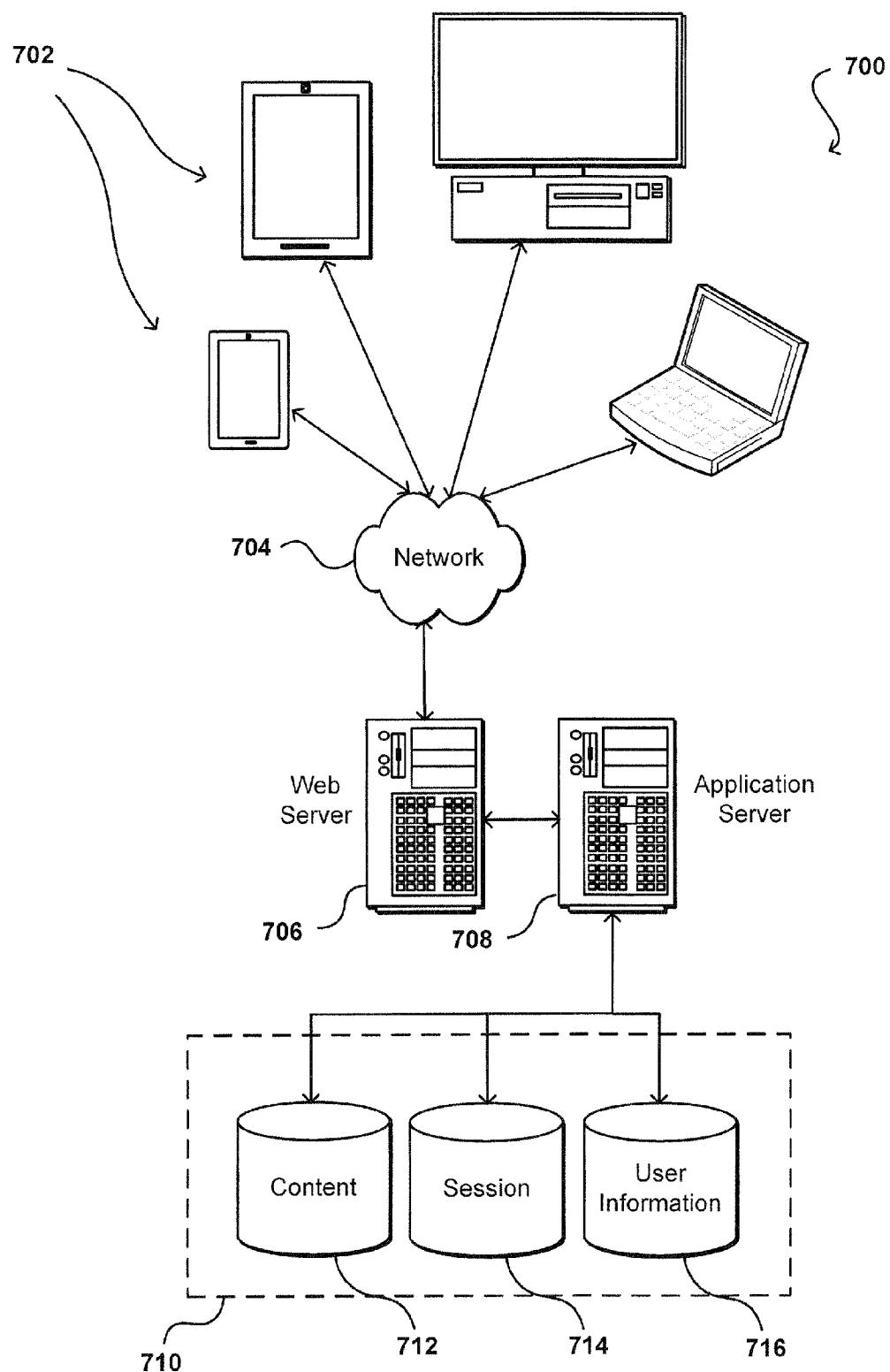
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for providing product information for a specified product to a customer in a store, comprising:
   at least one processor; and
   memory including instructions that, when executed by the at least one processor, cause the system to:
      receive, from a computing device associated with the customer, an image of the specified product;
      track a location of the customer in the store by comparing a background light pattern of the image to ambient light patterns detected through sensors placed throughout the store, the ambient light patterns corresponding to a section of the store, the section of the store including a type or brand of product;
      locate, in the image, one or more features of the specified product;
      match the one or more features of the specified product against one or more features of each of a plurality of products in the store, wherein the plurality of products is selected based at least in part on proximity of the products to the location of the customer; and transmit the product information for at least one matched product to the computing device to be presented to the customer, wherein the product information includes at least price, size and availability of the at least one matched product in the store.

2. The system of claim 1, wherein the instructions when executed further cause the system to:

extract features from the background of the image; and pinpoint the location of the customer by matching the extracted features against in-store visual information for the store.

3. The system of claim 1, wherein the instructions when executed further cause the system to:

update the location of the specified product by at east taking into account the determined location of the customer when the specified product is matched.

4. The system of claim 1, wherein a management server of the store is configured to dynamically update the product information on a needed basis by taking into account products that have been checked out by other customers in the store and put into shopping carts by other customers in the store.

5. A computer-implemented method, comprising:

receiving an image of a specified product from a computing device of a customer in a store;

determining a location of the customer in the store by comparing a background light pattern of the image to ambient light patterns detected through sensors placed throughout the store, the ambient light patterns corresponding to a section of the store, the section of the store including a type or brand of product;

matching one or more characteristics of one or more objects in the image against features of one or more products offered via the store, wherein the one or more products are selected based at least in part on proximity of the products to the location of the customer; and transmitting product information for at least one matched product to the computing device to be presented to the customer.

6. The computer-implemented method of claim 5, further comprising:

analyzing sensor data from the computing device to extract geolocation data; and determining the location of the customer by matching the geolocation data against GPS coordinates of the store.

7. The computer-implemented method of claim 5, further comprising:

calibrating GPS coordinates of at least three Wi-Fi and/or Bluetooth transmitters placed throughout the store;

receiving, by the at least three Wi-Fi and/or Bluetooth transmitters, signals from the computing device;

analyzing signal strength received by the at least three Wi-Fi and/or Bluetooth transmitters; and determining the location of the customer by using one or more triangulation algorithms to calculate distances from the computing device to the at least three Wi-Fi and/or Bluetooth transmitters.

8. The computer-implemented method of claim 5, further comprising:

analyzing sensor data from the computing device to extract sound waves at the location of the customer; and determining the location of the customer by matching the sound waves against pre-learnt sound patterns at specific locations in the stores.

9. The computer-implemented method of claim 5, further comprising:

receiving, from the computing device, one or more voice commands of the customer;

analyzing the one or more voice commands to extract information corresponding to the location of the customer; and combining the information extracted from the one or more voice commands in the determining process of the location of the customer.

10. The computer-implemented method of claim 5, further comprising:

selecting one or more algorithms to be applied in the matching process at least based on one or more product categories in the proximity of the customer's location.

11. The computer-implemented method of claim 10, further comprising:

pre-loading the product information of the one or more products and the one or more algorithms onto the computing device to maximize product searching experience for the customer;

matching, by the computing device, the one or more characteristics of the one or more objects in the image against the features of the one or more products; and presenting, by the computing device, the product information of the at least one matched product to the customer.

12. The computer-implemented method of claim 5, further comprising:

extracting one or more features from the background of the image; and determining the location of the customer by matching extracted background features against in-store visual information for the store.

13. The computer-implemented method of claim 12, further comprising:

determining a specific 3D area that the customer is viewing when taking the image by analyzing the extracted background features, or sensor data from the computing device when the customer was taking the image; and limiting the one or more products in the matching process to products in the specific 3D area.

14. The computer-implemented method of claim 5, further comprising:

enabling the customer to select a refinement to the product information presented, the refinement corresponding to a selected product attribute, wherein the product information includes at least price, size and availability of the at least one matched product in the store.

15. The computer-implemented method of claim 5, further comprising:

updating product information in the store by at least taking into account inventory information of the one or more products in the proximity of the customer's location, the inventory information of the one or more products including at least one product matched or found missing in the matching process.

16. The computer-implemented method of claim 15, wherein the image of the specified product is saved for future matching against images taken by other customers in the store.

17. A non-transitory computer-readable storage medium including instructions that, when executed by at least one processor of a computing system, cause the computing system to:
- receive an image of a specified product from a computing device of a customer;
- match one or more features of the specified product against features of one or more products currently offered via a store;
- transmit product information for at least one matched product to the computing device to be presented to the customer; and
- determine a location of the customer in the store by comparing a background light pattern of the image to ambient light patterns detected through sensors placed throughout the store, the ambient light patterns corresponding to a section of the store, the section of the store including a type or brand of product.

18. The non-transitory computer-readable storage medium of claim 17, wherein the product information includes at least price, size and availability of the at least one matched product in the store, and wherein the specified product has no bar code.

19. The system of claim 1, wherein the detected light patterns are pre-learnt.

20. The system of claim 1, wherein the detected light patterns are dynamically learned.

21. The computer-implemented method of claim 5, wherein the detected light patterns are pre-learnt.

22. The computer-implemented method of claim 5, wherein the detected light patterns are dynamically learned.

23. The non-transitory computer-readable storage medium of claim 17, wherein the instructions when executed further cause the computing system to:
- determine a product category located within a proximity of a customer's location, the product category being associated with a matching algorithm; and
- select the matching algorithm to be applied in the matching process based at least in part on the product category.

24. The non-transitory computer-readable storage medium of claim 23, wherein the instructions when executed further cause the computing system to:
- pre-load product information of the one or more products and the matching algorithm onto the computing device to maximize product searching experience for the customer, wherein the one or more products are selected based at least in part on proximity of the products to the location of the customer.

* * * * *